Figure 1:
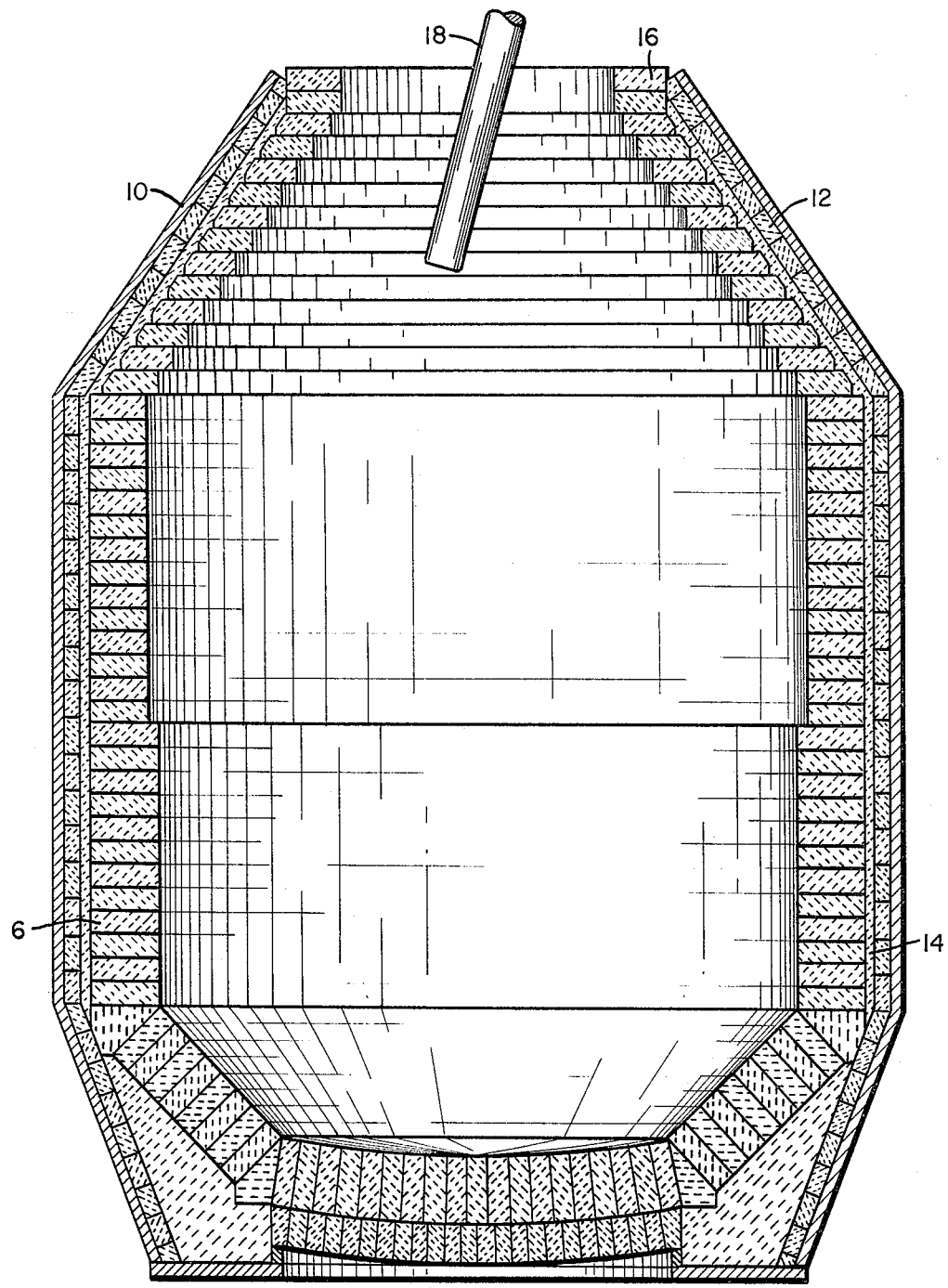

Oct. 25, 1966   A. M. ALPER ETAL   3,281,137
REFRACTORY AND FURNACE LINING
Filed Feb. 12, 1964   2 Sheets-Sheet 1

INVENTORS.
Allen M. Alper
Robert N. McNally
BY
Clarence R. Patty, Jr.
ATTORNEY

Oct. 25, 1966 A. M. ALPER ETAL 3,281,137
REFRACTORY AND FURNACE LINING
Filed Feb. 12, 1964 2 Sheets-Sheet 2

INVENTORS.
Allen M. Alper
Robert N. McNally
BY
Clarence R. Patty, Jr.
ATTORNEY

United States Patent Office 3,281,137
Patented Oct. 25, 1966

3,281,137
REFRACTORY AND FURNACE LINING
Allen M. Alper, Corning, and Robert N. McNally, Horseheads, N.Y., assignors to Corhart Refractories Company, Louisville, Ky., a corporation of Delaware
Filed Feb. 12, 1964, Ser. No. 346,058
11 Claims. (Cl. 266—35)

This is a continuation-in-part of application Serial No. 311,782, filed September 26, 1963, now abandoned.

This invention relates to a novel fused basic refractory material, especially fused cast basic refractory material, which is especially suitable for use in oxygen lanced or basic oxygen steelmaking furnaces, and to basic oxygen furnaces or vessels containing a lining made up of the novel fused refractory material. As is well known, fused refractory is the type of refractory material which is commonly produced by melting a mass of refractory material of the desired composition and then cooling the molten refractory material to form a solidified refractory mass. The molten refractory material may be cast and solidified in a mold to form particular shapes, or the molten refractory can be solidified within the same container in which it was melted. Additionally, some of the novel fused basic refractory material can be made in the form of small granules or grain by the well known techniques of disintegrating the molten refractory into small globules or particles, which are then solidified, or by crushing larger solidified masses of the refractory.

A basic oxygen furnace, in broad terms, comprises a substantially pear-shaped steelmaking vessel or converter generally similar to those used in the Thomas or basic Bessemer process developed in 1877, but in which pure oxygen is used instead of air. The Thomas vessels had a basic refractory lining, utilized a basic slag and were bottom blown with air. The modern day basic oxygen furnaces, vessels or converters, developed in the past decade, while continuing the use of a basic refractory lining and a basic slag, commonly differ from the old Thomas vessels (in addition to employing oxygen instead of air) in that they are top blown instead of bottom blown. The tuyeres in the bottom of the old Thomas vessels are omitted and instead positively cooled oxygen lances (e.g. water cooled copper tubing) are positioned downwardly into the open top of the converters or vessels so as to direct the blast of oxygen onto the surface of the molten metal in the converters or vessels. It is these top blown types of basic oxygen furnaces or converters that are used in the now well known processes, such as the LD process developed in Austria, the Rotor process developed in Germany and the Stora-Kaldo process developed in Sweden. Of course, there are also the side-blown types of converters (e.g. Tropenas converters) that might be employed as basic oxygen furnaces when equipped with appropriate basic refractory lining.

The environment in basic oxygen steelmaking furnaces presents a rather severe corrosion and erosion problem for the working linings, particularly for side wall linings. The more detrimental factors of such environment contributing to this problem are: the high temperatures developed by the oxygen blast, the washing action of the molten contents against the refractory linings, the corrosive nature of the high lime slags and slag vapors, the reducing nature of the carbon monoxide atmosphere developed. Refractories that has been utilized for working linings in these furnaces have been composed of burnt or tar bonded dolomites and magnesites or mixtures thereof. Although these refractories exhibit a relatively modest corrosion-erosion resistance in basic oxygen furnace environments, there has developed a great desire upon the part of the operators of these furnaces for a refractory having a greatly improved corrosion-erosion resistance in order to incease the life of the working linings.

We have now discovered novel basic fused and fused grain refractory material that possess a corrosion-erosion resistance in basic oxygen furnace environments greatly superior to that of the burnt or tar bonded basic refractory used heretofore. Accordingly, it is an object of this invention to provide such novel and improved basic fused cast and fused grain refractory material. It is another object of this invention to provide, in a basic oxygen furnace, a lining of the aforesaid novel and improved refractory material capable of longer service life than the burnt or tar bonded basic refractories used heretofore. It is a further object of this invention to provide a novel basic fused cast refractory characterized by superior hot strength and superior in-service spal resistance under thermal cyclining conditions.

Additional objects, features and advantages of the present invention will become apparent, to those skilled in the art, from the following detailed description and the attached drawing, wherein:

FIGURE 1 is a vertical, cross-sectional view of a representative basic oxygen vessel having a working lining made up of basic fused refractory brick according to this invention, and FIGURES 2 through 6 illustrate a scheme of spalling defect classification for thermally cycled brick.

Our novel fused cast refractory material consists of, analytically in percent by weight, at least about 70% MgO, 0.5% to 18% $TiO_2$, up to 29.5% RO where R is a member selected from the group consisting of Fe, Ca, Ba, Sr and mixtures thereof, less than 10% of oxide selected from the group consisting of $Al_2O_3$, $ZrO_2$, and mixtures thereof, and less than 4% of other oxide selected from the group consisting of $B_2O_3$, $SiO_2$, $P_2O_5$ and mixtures thereof. This superior corrosion-erosion resistant fused cast refractory is readily manufacturable into substantially crack-free bodies by melting a mixture of suitable raw materials, for example, magnesia and titania. As will be appreciated, relatively high temperatures (e.g. approx. 2000–2800° C.) are required to fuse and melt the compositions of this invention. Preferably, conventional electric arc melting furnaces are employed, although any other suitable means can be used as desired. The raw batch materials are suitably proportioned to provide the desired final composition and, preferably, are premixed prior to charging into the melting furnace.

The more usual form of our novel refractory for lining basic oxygen furnaces is that of bricks cast to shape, or cut from billets cast, by pouring the molten batch material into conventional preformed molds of any suitable material, e.g. graphite, bonded sand, or steel, and allowing it to cool and solidify according to conventional practice, for example, as disclosed in United States Patent 1,615,750 to G. S. Fulcher, to which reference may be had. If desired, of course, the novel refractory material can be melted and solidified in the same container. However, for compositions with not more than 13% $TiO_2$, a stream of the molten refractory materials can be disintegrated by known conventional techniques into small globules or particles of desired size and solidified as a mass of fused granular material. This granular material, with or without other additional refractory material, can then be used to form rebonded bricks of special shape that are not as easily formed by directly casting the shape from the molten material. Moreover, the granular material with not more than 13% $TiO_2$ for making rebonded bricks can be obtained by crushing blocks, billets or boules of the novel refractory material.

Referring now to the drawing, the basic oxygen furnace or vessel shown comprises a metal shell or tank 10, a permanent or tank lining 12, a rammed refractory interlayer 14, a working lining 16 and a lance 18 for introducing an oxygen blast. The lining 12 and interlayer 14 form a heat insulator to protect shell 10. In this typical illustration, the shell 10 is made of steel. The permanent lining 12 is often made up of burnt magnesia brick and the rammed interlayer 14 is formed of a conventional tar-dolomite ramming mix. The working lining 16 is built up of our novel fused basic refractory brick. The bricks in lining 16 are laid up usually with a conventional magnesia type mortar between the bricks.

It will be noted that our novel fused refractory may consists solely of the oxides of magnesium and titanium in the ranges specified above. However, it is preferred to use less pure, less expensive commercial raw materials that may additionally provide one or more of the other specified oxides (e.g. CaO, FeO, $SiO_2$, etc.) within the limits specified above. These additional oxides do not adversely affect the essential characteristics of our novel refractory and, in some cases they enhance these characteristics or provide additional special benefits. Notably, the permissible amounts of $Al_2O_3$, $B_2O_3$, $SiO_2$ and/or $P_2O_5$ help to increase hydration resistance of the fused refractory material and they facilitate melting. The permissible amount of $ZrO_2$ is believed to help increase resistance to hot siliceous vapors. For the latter purposes, deliberate additions of commercial raw material sources of these oxides may be made in suitable quantities.

In a more preferred form, our fused cast basic refractory according to this invention consists of, analytically in weight percent, more than 79% MgO, 0.5% to 18% $TiO_2$, up to 19.5% RO where R is a member selected from the group consisting of Fe, Ca, Ba, Sr, and mixtures thereof, up to 19.5% $Cr_2O_3$ and less than 10% of other oxide selected from the group consisting of $Al_2O_3$, $B_2O_3$, $SiO_2$, $ZrO_2$, $P_2O_5$ and mixtures thereof. In this preferred embodiment, greater amounts of certain other oxides (e.g. $Cr_2O_3$, $B_2O_3$, $SiO_2$, and $P_2O_5$) can be beneficially utilized because there is less of the aforementioned RO oxides with which these additive oxides may form detrimental lower melting phases. Thus, by this means of balancing the maximum amount of those various oxides that tend to form less refractory phases, our novel fused cast material possesses the refractoriness which is essential characteristic thereof. Again as noted above, the form of the preferred refractory composition can be fused grain for rebonded bricks provided the $TiO_2$ is not more than 13%. For optimum properties and results in basic oxygen furnace service, there are two particularly desirable composition areas suitable for both fused cast and fused grain material. In the first area, the novel refractory should consist of (analytically in weight percent) 85% to 95% MgO, 5.0% to 13% $TiO_2$, up to 10% RO where R is a member selected from the group consisting of Fe, Ca, Ba, Sr and mixtures thereof, and less than 5% of other oxides selected from the group consisting of $Cr_2O_3$, $Al_2O_3$, $B_2O_3$, $SiO_2$, $ZrO_2$, $P_2O_5$ and mixtures thereof. In the second area, the novel refractory should consist of (analytically in weight percent) at least 80% MgO, 1% to 13% $TiO_2$, 1% to 15% $Cr_2O_3$, up to 10% RO where R is a member selected from the group consisting of Fe, Ca, Ba, Sr and mixtures thereof, and less than 5% of other oxides selected from the group consisting of $Al_2O_3$, $B_2O_3$, $SiO_2$, $ZrO_2$, $P_2O_5$ and mixtures thereof. The second optimum area is somewhat superior to the first area with respect to high temperature strength.

By way of illustrating and providing a better appreciation of the present invention, the following detailed description and data are given concerning refractory samples, of the invention and of prior materials, and their properties or characteristics.

Table I shows composition mixtures that were electric arc melted and solidified to form refractory material according to the present invention as well as two examples outside the scope of this invention. The proportions are in percent by weight.

TABLE I

| Melt No. | Magnesite | Rutile | Lime | Alumina | Other |
|---|---|---|---|---|---|
| 1 | 90 | 10 | | | |
| 2 | 90 | 10 | | | |
| 3 | 90 | 10 | | | |
| 4 | 85 | 15 | | | |
| 5 | 80 | 20 | | | |
| 6 | 90 | | | | 10 Ilm. |
| 7 | 85 | 10 | 5 | | |
| 8 | 75 | 15 | 10 | | |
| 9 | 80 | 10 | 5 | 5 | |
| 10 | 85 | 10 | | 5 | |
| 11 | 80 | 10 | | 10 | |
| 12 | 95 | 2.5 | | | 2.5 TCO. |
| 13 | 80 | 10 | | | 10 TCO. |
| 14 | 80 | 15 | | | 5 $Cr_2O_3$. |
| 15 | 80 | 5 | | | 15 TCO. |
| 16 | 80 | 1 | | | 19 TCO. |
| 17 | 81 | 5 | | | 14 $Cr_2O_3$. |
| 18 | 81 | 1.5 | | | 17.5 $Cr_2O_3$. |
| 19 | 85 | 12 | | | 3 $B_2O_3$. |
| 20 | 93 | 1 | | | 6 ZS. |
| 21 | 80 | 10 | | | 10 TCP |

The various constituents in the above mixtures were provided by common commercially available raw materials whose typical chemical analyses, in weight percent, were as follows:

Calcined magnesite: 98.51% MgO, 0.86% CaO, 0.28% $SiO_2$, 0.22% $Fe_2O_3$, 0.13% ignition loss.

Rutile: 96–98% $TiO_2$, 1% max. $Fe_2O_3$, 0.3% $ZrO_2$, 0.3% $Al_2O_3$, 0.25% $SiO_2$, 0.1% $Cr_2O_3$, 0.29% $V_2O_5$, 0.025–0.05% $P_2O_5$, 0.01% S.

Ilmenite ore (Ilm.): 63.14% $TiO_2$, 31.7% $Fe_2O_3$, 0.5% $Al_2O_3$, 0.4% MgO, 0.3% $SiO_2$, 0.12% $Cr_2O_3$.

Rotary kiln lime: 95.65% CaO, 1.30% $SiO_2$, 0.85% MgO, 0.85% $R_2O_3$, 0.04% S, 0.85% ignition loss.

Bayer process alumina: 99.2% $Al_2O_3$, 0.45% $Na_2O$, 0.03% $Fe_2O_3$, 0.02% $SiO_2$, 0.3% ignition loss.

Transvaal chrome ore (TCO): 44% $Cr_2O_3$, 23% $FeO+Fe_2O_3$, 13% $Al_2O_3$, 12% MgO, 4% $SiO_2$, 0.5% CaO, 0.4% $TiO_2$.

Green chrome oxide: 99.75% $Cr_2O_3$.

Anhydrous boric acid: 98.9% $B_2O_3$.

Zircon sand (ZS): 67.33% $ZrO_2$, 32.40% $SiO_2$, 0.18% FeO, 0.18% $TiO_2$.

Anhydrous tricalcium phosphate (TCP): 52.7% CaO, 41.0% $P_2O_5$, 6.1% ignition loss.

It has been found that if the batch mixtures are rapidly melted (e.g. within 5–15 minutes), the analysis of the solidified refractory is essentially the same as that of the batch mixture. Longer melting time does produce some volatilization losses. As an illustration of this situation, Melt No. 1 was melted for 30 minutes within a lining of unmelted batch material of the same composition and then cast into a preformed mold. Melt No. 2 was melted from the same batch mixture as Melt No. 1 for only 15 minutes and then cast into a similar mold. The analyses (by X-ray fluorescence) of the cast blocks from these two melts are as follows, in percent by weight:

| Melt No. | MgO | $TiO_2$ |
|---|---|---|
| 1 | 94.6 | 5.4 |
| 2 | 90.7 | 9.3 |

All the other melts shown in Table I were melted under essentially the same conditions as Melt No. 2 thereby yielding at least about 90–93% retention of the $TiO_2$ batched with a corresponding increase in the percentage of MgO while all the other constituent oxides remained substantially the same as batched. Melt No. 4 was cast in a mold like Melt Nos. 1 and 2 while all the other melts were solidified in the melting furnace where they were melted.

The following data illustrate the important and essential characteristics of our novel fused material.

Table II shows the results of slag resistance tests for various refractory samples, of the invention and of prior materials. The numbered samples were the solidified products of the correspondingly numbered melts in Table I. Samples A were of commercial tar bonded dolomite brick. Samples B were of commercial tar bonded magnesia brick.

The slag resistance test, from which the data in Table II were obtained, comprises placing 1½" x 1" x ½" samples in a gas-oxygen furnace adapted to approximate a basic oxygen furnace. At 1700° C. for about two hours, the samples were passed, with one of their largest surfaces facing upward, through a downwardly directed stream of molten basic slag droplets at a substantially uniform rate of 72 times per hour. The slag was a representative basic furnace slag of the following composition, in percent by weight: 22% $Fe_3O_4$, 20% $SiO_2$, 39% CaO, 10% $4CaO \cdot P_2O_5$, 6% MgO and 3% $Al_2O_3$. At the end of the two-hour test, the average thickness of the samples in their corroded areas was measured and compared with the original ½" thickness prior to testing. The results given in Table II express this comparison as a percentage change in thickness.

TABLE II

| Samples: | Percent slag cut |
|---|---|
| 3 | 11, 10, 6 |
| 5 | 51, 27 |
| 11 | 46 |
| 13 | 6 |
| 15 | 10 |
| A | 72, 32, 100 |
| B | 27, 29, 27 |

The data in Table II clearly show the substantial improvement in corrosion-erosion resistance of the refractory material of the present invention (i.e. Samples 3) for basic oxygen furnace service. The data for Samples 5 illustrate the adverse effect of excessive $TiO_2$. The data for Sample 11 illustrates the importance of restricting the amount of the other permissible oxide additions in order to avoid destroying the superior high lime slag resistance of our novel refractory.

Two other important characteristics of our novel refractory are superior hot strength and superior in-service spall resistance. The range of modulus of rupture (MOR) values obtained on several samples while at a temperature of 1340° C. are given in Table III.

TABLE III

| Samples: | MOR at 1340° C. (p.s.i.) |
|---|---|
| 2 | 5370–6110 |
| 13 | 5520–6150 |
| 15 | 3440–5550 |

As an illustration of the outstanding spalling resistance of our novel refractory, a panel of three 3" x 4½" x 13½" test bricks of Melt No. 2 were subjected to an accelerated test simulating the characteristic thermal gradient and cyclic thermal changes that occur in steel-making furnace refractories, such as those in open-hearth roofs. The test consists of heating the panel to 1250° C., and subjecting the bricks to a programed thermal cycle consisting of: 2 hours hold at 1250° C., 2 hours heating up to 1650° C., 2 hours hold at 1650° C., 2 hours cooling to 1250° C., and repeating this cycle an additional 59 times for a total of 60 cycles. At the end of 60 cycles, the bricks are cooled to room temperature and classified by visual observation in accordance with the following scheme:

TABLE IV

Figure 2:
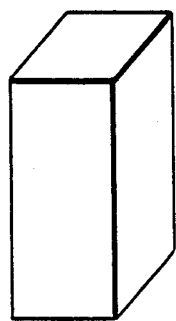
Figure 3:
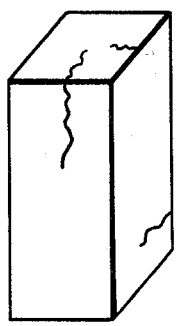
Figure 4:
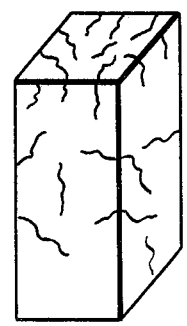
Figure 5:
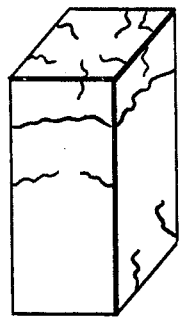
Figure 6:
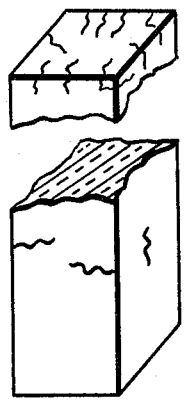

| Defect Class | Type of Defect | Typical Appearance |
|---|---|---|
| 1 | No cracks | FIGURE 2. |
| 2 | Minor hot face and body cracks | FIGURE 3. |
| 3 | Extensive hot face and body cracks | FIGURE 4. |
| 4 | Tight spall crack | FIGURE 5. |
| 5 | Loose spall | FIGURE 6. |

The melt No. 2 bricks were found to have an average classification of 2.0.

As a further illustration of the superior in-service spall resistance possessed by our novel fused refractory material, the above-described accelerated spalling test was continued beyond sixty cycles and stopped only after the samples had developed a loose spall like that shown in FIGURE 6. This extended test was performed on 3" x 4½" x 13½" blocks of Melt No. 2 solidified material and two other prior art basic refractory materials and the total number of cycles completed at the time the complete loose spall occurred are noted in Table V. Samples C were a fused and cast mixture of 55% calcined magnesite and 45% Transvaal chrome ore (representative of the material according to U.S. Patent 2,599,566 to R. J. Magri, Jr.). Samples D were the more conventional basic refractory materials made by chemically bonding and/or sintering raw refractory batch materials comprising mixtures of 50–60% dead burned magnesite and 40–50% Philippine chrome ore. A typical analysis of Philippine chrome ore is: 30.1% $Cr_2O_3$, 33.1%, $Al_2O_3$, 13.2% $Fe_2O_3$ +FeO, 17.5% MgO, 4.6% $SiO_2$, 0.3% CaO, 0.2% $TiO_2$, 0.2% alkali metal oxide. The data presented in Table V are the results of testing at least three block samples for each material.

TABLE V

| Sample: | Cycle to spall |
|---|---|
| 2 | 310–520 |
| C | 180–250 |
| D | 60–120 |

It will be apparent that, while the novel basic oxygen furnace linings constructed of the hereindescribed novel basic fused refractory material are considered part of the present invention, the novel refractory material per se can be applied in other forms, structures and uses as desired or deemed suitable without departing from the scope of the invention. For example, in view of the above-noted combination of superior characteristics, our novel basic fused refractory material can be advantageously used in open-hearth furnaces and particularly in roofs of oxygen lanced open-hearth furnaces.

As used in this specification and the following claims, the term "analytically" means that the content of oxides of the various metals and metalloids in the refractory are calculated, respectively, in terms of the specific oxide compounds indicated, e.g. $TiO_2$FeO, etc., although they may not exist in the fused refractory material in the form or oxidation state of such compounds. Thus, for example, titanium oxide could be present in an oxidation state to form TiO or $Ti_2O_3$. Likewise, iron oxide could be present in an oxidation state to form $Fe_2O_3$.

Although the present invention has been described with respect to specific details of certain embodiments thereof, it is not intended that such details be limitations upon the scope of the invention except insofar as set forth in the claims.

We claim:
1. A fused cast refractory consisting of, analytically by weight, at least 70% MgO, 0.5% to 18% $TiO_2$, and
   (a) when MgO is in the range of 70% to 79%, the balance being up to 29.5% RO where R is Fe, Ca,

Ba, Sr and mixtures thereof, less than 10% of $Al_2O_3$, $ZrO_2$ and mixtures thereof, and less than 4% of $B_2O_3$, $SiO_2$, $P_2O_5$ and mixtures thereof; and
(b) when MgO is more than 79%, the balance being up to 19.5% RO where R is Fe, Ca, Ba, Sr and mixtures thereof, up to 19.5% $Cr_2O_3$, and less than 10% of $Al_2O_3$, $B_2O_3$, $SiO_2$, $ZrO_2$, $P_2O_5$ and mixtures thereof.

2. A fused refractory material consisting of, analytically by weight, at least 70% MgO, 0.5% to 13% $TiO_2$ and
(a) when MgO is in the range of 70% to 79%, the balance being up to 29.5% RO where R is Fe, Ca, Ba, Sr and mixtures thereof, less than 10% of $Al_2O_3$, $ZrO_2$ and mixtures thereof, and less than 4% of $B_2O_3$, $SiO_2$, $P_2O_4$ and mixtures thereof; and
(b) when MgO is more than 79%, the balance being up to 19.5% RO where R is Fe, Ca, Ba, Sr and mixtures thereof, up to 19.5% $Cr_2O_3$, and less than 10% of $Al_2O_3$, $B_2O_3$, $SiO_2$, $ZrO_2$, $P_2O_5$ and mixtures thereof.

3. A fused refractory material consisting of, analytically by weight, 85% to 95% MgO, 5.0% to 13% $TiO_2$, up to 10% RO where R is a member selected from the group consisting of Fe, Ca, Ba, Sr and mixtures thereof, and less than 5% of other oxides selected from the group consisting of $Cr_2O_3$, $Al_2O_3$, $B_2O_3$, $SiO_2$, $ZrO_2$, $P_2O_5$ and mixtures thereof.

4. A fused refractory material consisting of, analytically by weight, at least 80% MgO, 1% to 13% $TiO_2$, 1% to 15% $Cr_2O_3$, up to 10% RO where R is a member selected from the group consisting of Fe, Ca, Ba, Sr and mixtures thereof, and less than 5% of other oxides selected from the group consisting of $Al_2O_3$, $B_2O_3$, $SiO_2$, $ZrO_2$, $P_2O_5$ and mixtures thereof.

5. As an article of manufacture, of casting composed of the fused refractory material according to claim 2.

6. As an article of manufacture, a casting composed of the fused refractory material according to claim 3.

7. As an article of manufacture, a casting composed of the fused refractory material according to claim 4.

8. In a basic oxygen furnace comprising a generally pear-shaped tank, refractory lining covering the internal surfaces of said tank and means for providing an oxygen blast directed into said refractory lined tank, the improvement comprising the refractory of claim 1 forming at least part of said refractory lining.

9. In a basic oxygen furnace comprising a generally pear-shaped tank, insulating refractory lining covering the internal surface of said tank, working refractory lining covering the internal surfaces of said insulating refractory lining and means for providing an oxygen blast directed into said refractory lined tank, the improvement comprising the refractory material of claim 2 forming at least part of said working refractory lining.

10. In a basic oxygen furnace comprising a generally pear-shaped tank, insulating refractory lining covering the internal surfaces of said tank, working refractory lining covering the internal surfaces of said insulating refractory lining and means for providing an oxygen blast directed into said refractory lined tank, the improvement comprising the refractory material of claim 3 forming said working refractory lining.

11. In a basic oxygen furnace comprising a generally pear-shaped tank, insulating refractory lining covering the internal surfaces of said tank, working refractory lining covering the internal surfaces of said insulating refractory lining and means for providing an oxygen blast directed into said refractory lined tank, the improvement comprising the refractory material of claim 4 forming said working refractory lining.

References Cited by the Examiner

UNITED STATES PATENTS 3,198,643   8/1965   Alper et al. _____ 106—59

JOHN F. CAMPBELL, *Primary Examiner.*

J. M. ROMANCHIK, *Assistant Examiner.*